T. S. MOUCHET.
PEA PICKER.
APPLICATION FILED FEB. 5, 1917.
1,255,914. Patented Feb. 12, 1918.
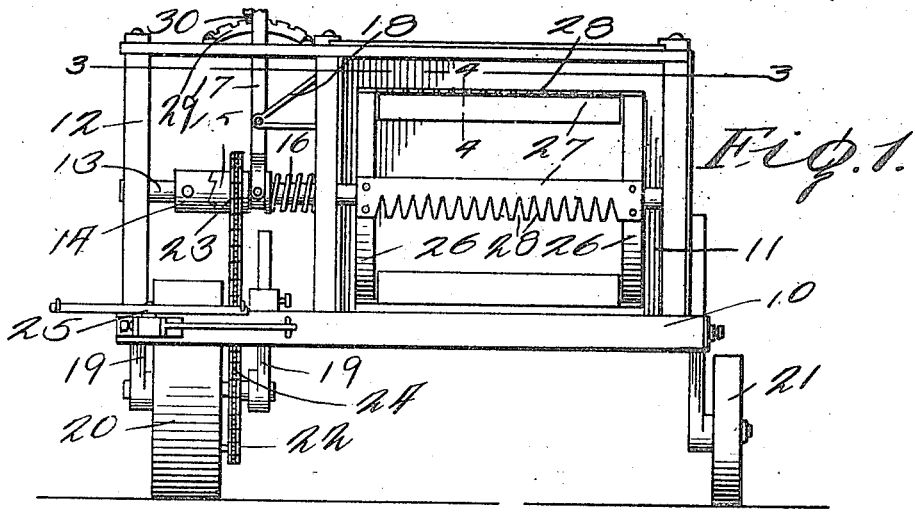
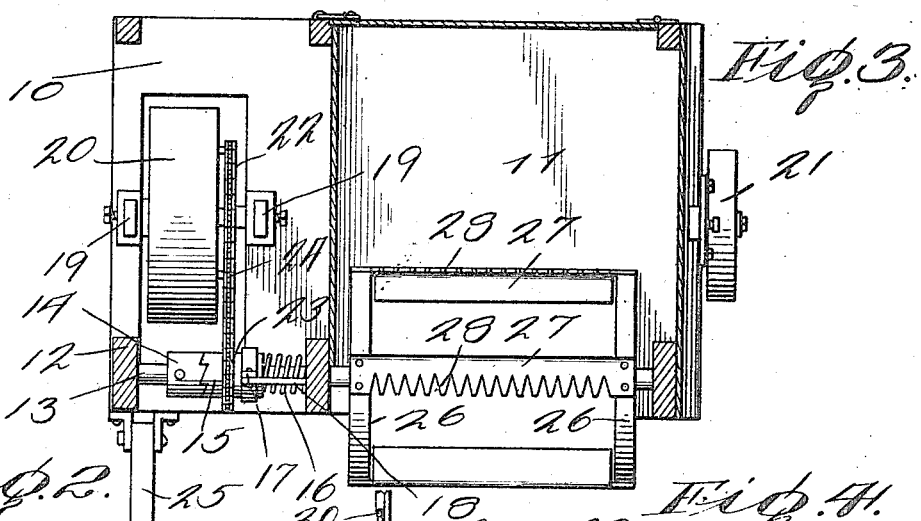
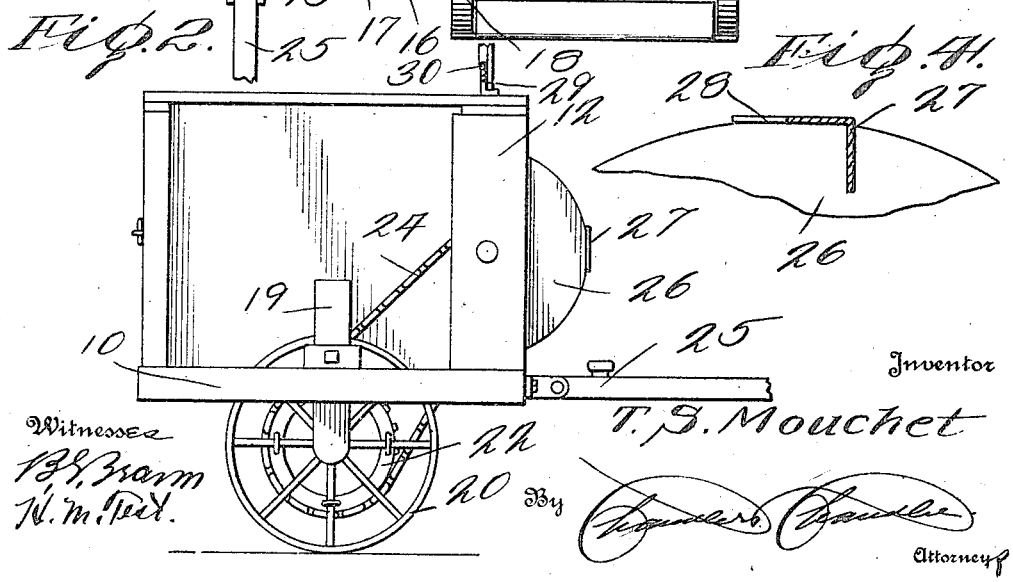

UNITED STATES PATENT OFFICE.

THEODORE S. MOUCHET, OF BOWERSVILLE, GEORGIA.

PEA-PICKER.

1,255,914.　　　　Specification of Letters Patent.　　Patented Feb. 12, 1918.

Application filed February 5, 1917. Serial No. 146,746.

*To all whom it may concern:*

Be it known that I, THEODORE S. MOUCHET, a citizen of the United States, residing at Bowersville, in the county of Hart, State of Georgia, have invented certain new and useful Improvements in Pea-Pickers; and I do hereby declare the following to be a full, clear, and exact description of the invention, such as will enable others skilled in the art to which it appertains to make and use the same.

This invention relates to improvements in pea or bean pickers.

One object of the present invention is to provide a novel and simple device of this character which is adapted to be drawn along the rows of peas or beans and knock the peas or beans from the vines into a receptacle carried by the device.

Another object of the present invention is to provide a device which includes a novel means for detaching the peas or beans from the vines.

Other objects and advantages will be apparent from the following description when taken in connection with the accompanying drawing.

In the drawing:

Figure 1 is a front elevation of a pea picker made in accordance with my invention.

Fig. 2 is a side elevation of the same.

Fig. 3 is a horizontal sectional view taken on the line 3—3 of Fig. 1.

Fig. 4 is an enlarged vertical sectional view through the picking drum, taken on the line 4—4 of Fig. 1.

Referring particularly to the accompanying drawing, 10 represents a horizontally disposed frame, and on one end of this frame is mounted a receptacle 11 for the reception of the picked peas, as will be more clearly set forth later. Uprights 12 are carried by the other end of the frame, and supported in the forward pair of said uprights is a horizontally disposed shaft 13, said shaft extending through the forward portion of the said receptacle 11. This forward end of the receptacle is open as clearly shown. Rigidly secured on the shaft, adjacent the outer of the front uprights, is a clutch member 14, which is adapted to be engaged by a loosely arranged and spring pressed clutch member 15 also mounted on the shaft. The clutch member 15 is normally urged toward the clutch member 14 by a coil spring 16 which bears against one of the uprights and the clutch member. A forked lever 17 is mounted on the frame 18, which frame is supported by the uprights, and said lever engages with the movable clutch member whereby the same is capable of being moved and held out of engagement with the other clutch member. A pair of adjustable bearings 19 are carried by the adjacent end of the frame 10, and support a ground engaging wheel 20, which wheel supports this end of the machine. The other, or receptacle, end of the frame is supported by the ground engaging wheel 21. The first wheel 20 carries, as an integral or attached part thereof, a sprocket wheel 22, and formed on the movable clutch member 15 is a sprocket portion 23, the latter being driven from the former by means of the chain 24. A draft pole and doubletree means 25 are connected to the front of the frame, whereby the machine may be conveniently drawn by horses, through the rows of vines. The rear end of the receptacle is provided with a hinged door which may be conveniently opened to permit the removal of the picked peas.

Mounted on the shaft 13, within the open front end of the receptacle, is a drum which includes the end disks 26 and the connecting bars 27. This drum is rigidly connected to and rotates with the shaft, as will be understood. These bars are preferably formed of sheets of stiff metal and are bent along their longitudinal median lines into right angular shape, one portion extending radially inwardly between the disks, while the other portion is disposed on the plane of the periphery of the disks. The last named portion has its forward edge formed with teeth or serrations 28, which are arranged to rake the peas from the vines as the drum rotates and the machine proceeds forwardly along the row.

In going to or from the field, or when it is not desired to have the drum rotate, the lever 17 is rocked on its pivot to disengage the movable clutch member from the other clutch member, a suitable segment 29 being mounted adjacent the lever for engagement by a pawl 30 carried by the lever, whereby the movable clutch member can be properly held out of engagement with the other clutch member.

What is claimed is:

A pea picker including a driven shaft, a pair of spaced parallel disks secured to the shaft adjacent the ends thereof, and elongated angle bars extending between the disks and each having extensions on one part secured to the peripheral faces of the disks, the other part of each angle bar being snugly fitted between and contacting with the mutually adjacent side faces of the disks to brace the bar and hold the disks in proper spaced relation, the first-named portions of the bars having their forward edges formed with serrations.

In testimony whereof, I affix my signature, in the presence of two witnesses.

THEODORE S. MOUCHET.

Witnesses:
C. E. WILLIAMS,
L. W. WILLIAMS.